United States Patent [19]
Atkins et al.

[11] Patent Number: 5,704,727
[45] Date of Patent: Jan. 6, 1998

[54] BALL AND SOCKET JOINT ASSEMBLY WITH SELF-CENTERING RETAINER RING

[75] Inventors: Gregory R. Atkins, Toledo; Garth B. Maughan, Delta, both of Ohio

[73] Assignee: Dana Corporation, Toldeo, Ohio

[21] Appl. No.: 551,086

[22] Filed: Oct. 31, 1995

[51] Int. Cl.$^6$ .................................................. F16C 11/00
[52] U.S. Cl. ........................... 403/135; 403/133; 403/143; 403/147
[58] Field of Search ............................... 403/132, 133, 403/134, 135, 136, 137, 138, 140, 143, 147

[56] References Cited

U.S. PATENT DOCUMENTS

| | | | |
|---|---|---|---|
| 3,013,828 | 12/1961 | Kleinschmidt | 403/133 |
| 3,506,288 | 4/1970 | Gottschlad | 403/135 X |
| 3,711,136 | 1/1973 | Schmidt | 287/87 |
| 4,008,928 | 2/1977 | Abel | 308/72 |
| 4,241,463 | 12/1980 | Khovaylo | 3/1.913 |
| 4,353,660 | 10/1982 | Parks | 403/132 |
| 4,504,166 | 3/1985 | Morin | 403/147 |
| 4,577,989 | 3/1986 | Ito | 403/135 X |
| 4,690,581 | 9/1987 | Umemoto et al. | 403/133 |
| 4,695,181 | 9/1987 | Rahmeda et al. | 403/133 X |
| 4,714,368 | 12/1987 | Sawada et al. | 403/132 |
| 4,720,205 | 1/1988 | Ito | 403/135 X |
| 4,904,106 | 2/1990 | Love | 403/39 |
| 5,143,469 | 9/1992 | Cadeddu | 403/133 |

Primary Examiner—Kenneth J. Dorner
Assistant Examiner—Bruce A. Lev
Attorney, Agent, or Firm—Rader, Fishman & Grauer PLLC

[57] ABSTRACT

An inventive ball and socket joint has a metallic socket with a cavity that receives a semi-rigid annular bearing, a ball stud, and an annular rigid metallic retainer ring. The retainer ring is self-centering within the socket cavity. It includes a lower wedge portion that is received in a corresponding pocket formed between an upper stepped portion of the bearing and inner surface of the socket. Besides being self-centering, the retainer ring also acts as a wedge between the socket and bearing to provide a compression pre-load to the bearing which is controllably released as the bearing wears during use.

12 Claims, 3 Drawing Sheets

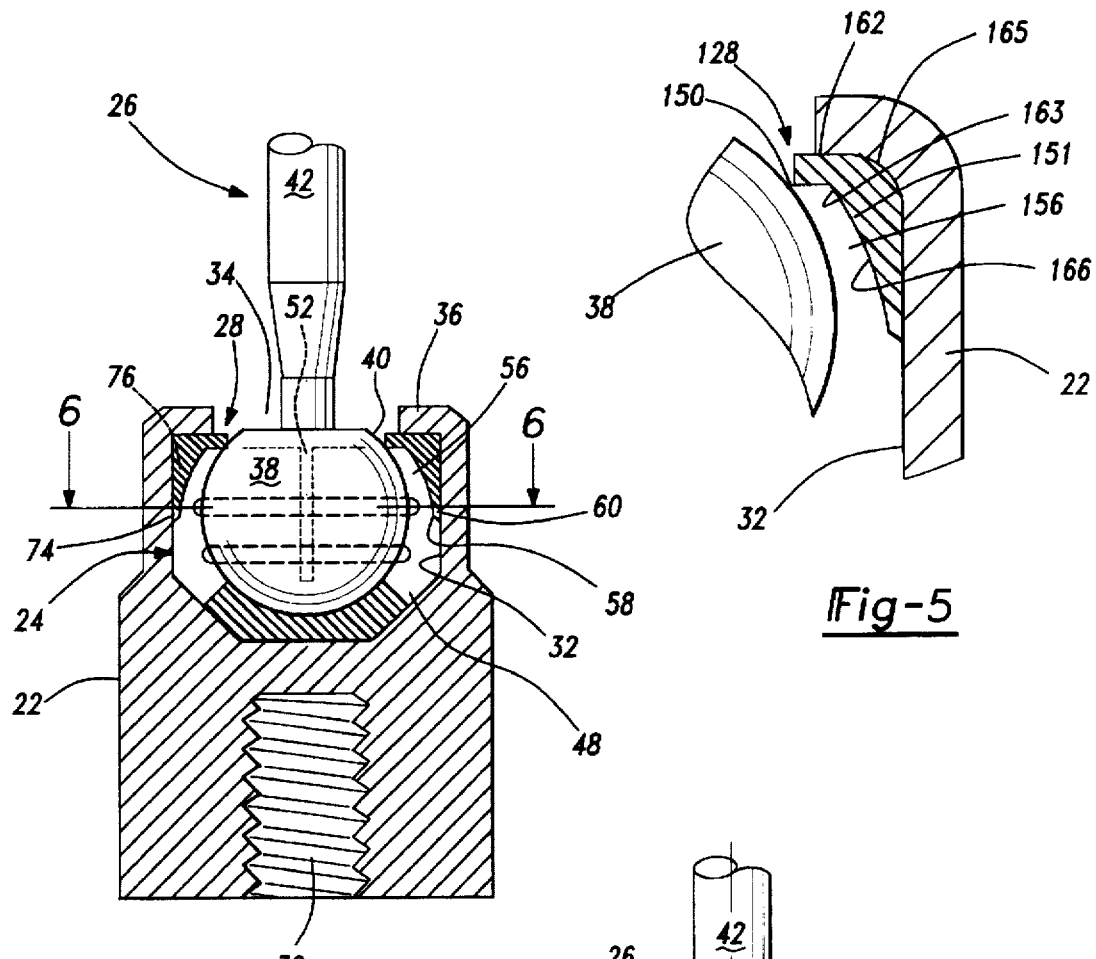
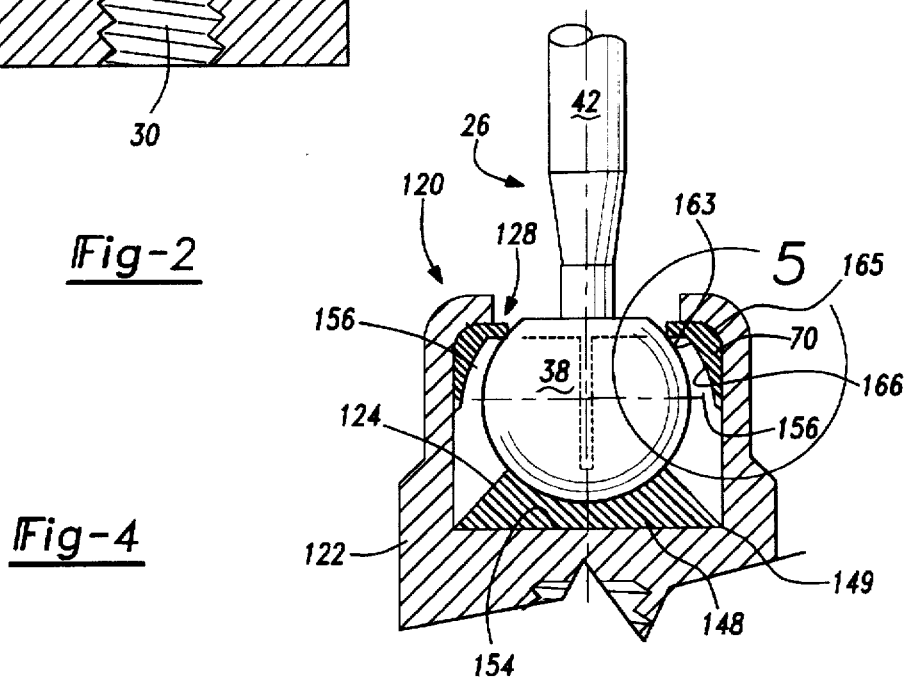
Fig-2
Fig-5
Fig-4

BALL AND SOCKET JOINT ASSEMBLY WITH SELF-CENTERING RETAINER RING

FIELD OF THE INVENTION

The present invention relates to a ball and socket joint assembly comprising a rigid metal socket, a semi-rigid bearing, a ball stud, and a rigid self-centering retainer ring.

BACKGROUND OF THE INVENTION

Ball and socket joints are used in a variety of applications, including rack and pinion inner tie rod socket assemblies, steering knuckles, drag links, and connecting rod assemblies. Such joints typically include a socket adapted to receive a bearing together with a metallic ball stud head. The bearing reduces the friction between the socket and ball head. A retainer ring is then inserted into the socket. When the socket is closed, the retainer ring is positioned between the bearing and the closure means.

Ball and socket joints using metal retainer rings have been subject to several disadvantages. If installed incorrectly, the retainer ring may be tilted or off center from the axis of the ball stud. Thus, stud pull out strength resistance may be decreased and both wear and fatigue life reduced. Radial and axial end play may also be affected, allowing unwanted movement of the bearing and ball stud within the socket. Further, if a mispositioned retainer ring comes into contact with the ball stud during operation, premature wear results, particularly if the contact is metal to metal. To address problems with positioning a retainer ring in a socket it has been known to use a specific tool for locating the retainer ring. Using such a tool increases assembly complexity and cost and may load to accidental damage to the retainer ring or the tool.

It is also known to use non-metallic retainer rings and even rings that are softer than the bearing body. Premature wear due to accidental contact with the ball stud is reduced. However, non-metallic retainer rings do not minimize axial or radial play of the assembled components. Instead, a deformable retainer ring promotes unwanted bearing and ball stud movement within the socket. Radial and axial pre-load compression of the bearing, as compared with the retainer, in combination with zero end play is necessary to provide an important self-adjusting feature. Wear takes place over time between the bearing and stud head. If a compression pre-load is stored directly in the bearing with the bearing restrained from movement by the socket and retainer ring, the pre-load can be controllably released to maintain zero axial or radial play of the assembled components.

SUMMARY OF THE INVENTION

An improved ball and socket joint assembly includes a rigid metallic socket, a semi-rigid bearing, a ball stud, and a self-centering annular metallic retainer ring that eliminates unwanted bearing end play while acting as a wedge to maximize the radial and axial compressive pre-load applied to the bearing.

The ball stud has a spherical stud head and a shank. The bearing includes a plurality of circumferentially spaced axially extending slits. When the stud head is pressed into the bearing to engage a spherical inner seat face, the slits allow the bearing to expand until the ball stud is seated against the seat face.

The socket has an inner surface defining a cavity about an axis of symmetry. The bearing and ball stud sub-assembly are disposed within the socket cavity. A nose portion of the bearing is adapted to conform to the inner surface of the socket. In one embodiment the nose portion has a frusto-conical shape, in a second it is generally cylindrical with square corners in cross-section, and in a third the nose portion is generally spherical.

The bearing includes a stepped portion which is spaced away from the inner surface of the socket and terminating at an axial end of the bearing. An annular pocket is defined between the stepped upper portion and the inner surface of the socket.

The retainer ring has a radially inner surface, a radially outer surface conforming to the inner surface of the socket, and an end wall defining an aperture at an upper end. The aperture receives the stud shank. The radially outer and inner surfaces of the ring define a wedge portion. The wedge portion is received within the annular pocket to center the ring between the bearing and the housing. One of the major advantages of having a self-centering retainer ring is the elimination of unwanted contact between the retainer ring and the ball head. Metal to metal contact significantly reduces wear and fatigue resistance.

Once the retainer ring is self-centered within the socket, the socket is closed. In one embodiment, an annular lip of the socket is crimped over the retainer ring. The self-centering nature of the retainer ring prevents it from being assembled in either a tilted or off-center orientation. Thus, stud pull out resistance is improved. Simultaneously, however, the closing of the socket applies a compressive force that is transmitted through the retainer ring into the bearing. The ring acts as a wedge to apply both radial and axial compressive force to the bearing which is controllably released as the bearing wears through use.

The relationship between the retainer ring and bearing stepped surface may be modified to increase or decrease the area of contact between the two elements to adjust for the desired level of torque required in the particular application.

BRIEF DESCRIPTION OF THE DRAWINGS

The features and inventive aspects of the present invention will become more apparent upon reading the following detailed description, claims, and drawings, of which the following is a brief description:

FIG. 2 is a cross-sectional side view of the first embodiment when assembled.

FIG. 4 is a cross-sectional side view of the invention according to a second embodiment.

FIG. 5 is an enlarged partial cross-sectional view of the encircled region 5 in FIG. 4.

DETAILED DESCRIPTION OF PREFERRED EMBODIMENTS

Figure 1:
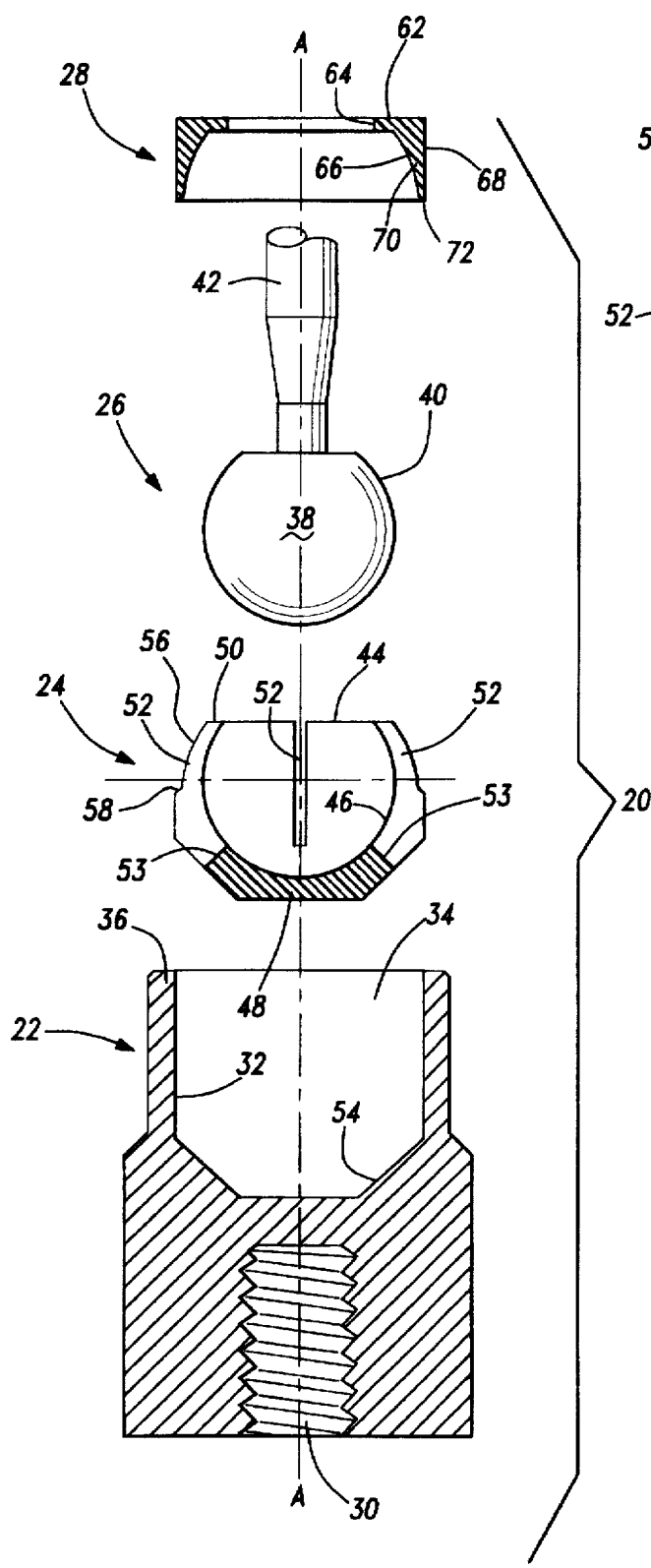
FIG. 1 is an exploded cross-sectional side view of a ball and socket joint assembly with a socket, bearing, ball stud, and retainer ring according to a first embodiment of the present invention.
Figure 3:
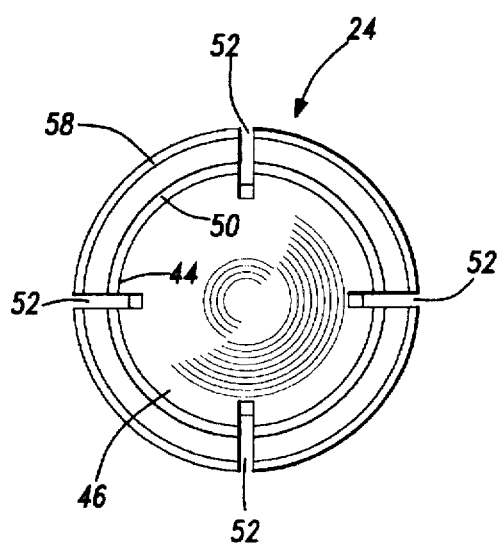
FIG. 3 is a top view of the bearing of the first embodiment.

A top closure ball and socket joint assembly 20, illustrated in FIGS. 1 through 3, includes a rigid metallic socket 22, a semi-rigid bearing 24, a ball stud 26, and a self-centering retainer ring 28. Joint assembly 20 is applicable to a wide range of "ball and socket" type applications including rack and pinion inner and outer tie rod socket assemblies, drag links and connecting rod assemblies, and upper and lower suspension ball joint assemblies.

Socket 22 includes a threaded aperture 30 adapted to secure assembly 20 to a mating part (not shown), an inner surface 32 defining a cavity 34 about an axis of symmetry A—A, and an annular lip 36. Preferably, socket 22 is formed from steel to provide necessary rigidity to joint 20 while allowing the crimping of annular lip 36 as discussed further below.

Ball stud 26 comprises a spherical stud head 38 with an outer surface 40 and an integral shank 42. Preferably, stud 26 is formed from a hardened steel.

Semi-rigid annular bearing 24 includes an opening 44 and a generally spherical inner seat face 46 adapted to conform to outer surface 40 of head 38. In the illustrated embodiment, face 46 extends between a nose portion 48 and an axial end 50. To facilitate the mating of bearing 24 and stud 26, bearing 24 includes a plurality of circumferentially spaced axially extending slits 52. Four such slits are illustrated in FIG. 3. As shown in FIG. 1, the slits include a portion 53 at an angle to axis A—A within nose portion 48. When stud head 38 is pressed through opening 44 into bearing 24, slits 52 allow bearing 24 to expand until the ball stud is seated against face 46. Once the ball stud is seated the bearing returns to its original shape due to the elastic characteristics of the bearing material.

Bearing 24 may be molded from a wide range of materials, depending on the individual application and the appropriate internal assembly force retention required during joint usage. Possible plastic-like semi-rigid bearing materials include nylons, acetals, urethanes, and polyethylenes. Unlike metal bearings, such bearings are significantly more wear resistant, particularly when there is insufficient lubrication. Further, unlike ball joint assemblies with a separate helical compression spring or disc spring, bearing 24 deforms elastically under load with very little permanent deformation while continuing to retain its stiffness during use. In contrast, springs take a "set" or lose force during use. Further, bearing 24 requires less space than a bearing and spring combination. More specifically, possible bearing materials are: polyethylene terephthalate, sold under the trade name "ERTALYTE" aramid aromatic polyamide polymer fiber, sold under the trade name "KEVLAR", and combined with 6,6 polyamide, sold under the trade name "NYLON", and resulting in a product sold under the trade names "HYDLAR" or "KEVLAR-NYLON"; 6,6 polyamide, sold under the trade name "NYLON", and combined with a lubricant such as molybdenum disulfide, and sold under the trade names "NYLATRON" and "MDS NYLON"; polyformaldehyde (polyacetal) polymer in oxymethylene linear structure with attached ester or ether terminal groups and sold under such trade names as "DELRIN" and "CELCON"; linear, amorphous polyester (polycarbonate), sold under such trade names as "LEXAN" and "HYZOND"; polymerized acrylonitrile-butadiene-styrene, sold under the trade name "ABS"; linear polyurethane elastomer in a high density, 75 "Shore D" hardness range, sold under the trade name "POLYURETHANE"; ultrahigh molecular weight polyethylene, sold under the trade name "UHMWPE"; chlorinated-polyvinyl-chloride, sold under the trade name "CPVC"; ethylene-hexene-1 copolymer, sold under the trade name "MARLEX"; polytetrafluoroethylene (filled), sold under the trade name "RULON"; polypropylene (polyolefin); and polyformaldehyde polymer filled with polytetrafluoroethylene fibers, sold under the trade name "DELRIN-AF".

After stud 26 is pressed into bearing 24, the bearing is inserted into cavity 34 of socket 22. Nose portion 48 has a frusto-conical shape adapted to conform to and be in facial contact with a corresponding floor 54 of socket 22. The frusto-conical shape permits easier molding of bearing 24. More importantly, however, frusto-conical nose portion 48 provides greater load support because of an increased bearing surface area, less axial end play and radial lash through the wedging action between the bearing and socket floor, and improved joint tightness without increased stud rotating torque. Increased rotating torque reduces the operability of assembly 20.

Bearing 24 has a stepped upper portion 56 defined between a step 58 and an axial end 50. As shown in FIG. 2, stepped portion 56 is spaced away from inner surface 32 to form an annular pocket 60. Step 58 is positioned slightly below the axial midpoint of bearing 24. As shown in cross-section, stepped portion 56 is angled to provide increased distance between bearing 24 and socket 22 at axial end 50.

Once stud head 38 is pressed into bearing 24 and bearing 24 inserted into cavity 34 of socket 22, retainer ring 28 is slipped over shank 42 and received into cavity 34 of socket 22. Preferably, retainer ring 28 is formed from a medium to a high carbon steel. Retainer ring 28 includes an end wall 62 defining an aperture 64 through which shank 42 passes. Retainer ring 28 also has a radially inner surface 66 and a radially outer surface 68. Surfaces 66 and 68 define a lower wedge portion 70 that terminates at a lower tip 72. Wedge portion 70 is received in annular pocket 60 to eliminate the need for manual centering of retainer ring 28 as it is inserted into cavity 34. Instead, inner surface 66 is contoured like the angled surface of portion 56 while outer surface 68 conforms to inner surface 32 of socket 22 to provide self-centering of the retainer ring. Preferably, both inner surface 66 and outer surface 68 of retainer ring 28 contoured like their mating element along essentially the entire axial extent of the retainer ring.

Once retainer ring 28 is inserted into socket 22 in combination with stud 26 and bearing 24, socket 22 is closed. The illustrated closure means involves crimping annular lip 36 about end wall 62 of retainer ring 28. Preferably, both crimped lip 36 and end wall 62 are generally perpendicular to axis A—A, the end wall providing a rigid surface for the lip to close over when joint assembly 20 is crimped closed. End wall 62 extends radially inwards so as to overlap axial end 50 of bearing 24. In the present embodiment, end wall 62 is sharply angled with respect to both inner surface 66 and outer surface 68. This provides higher pull out strength resistance for socket 22. Such an arrangement is appropriate for applications which have high load requirements.

When socket 22 is closed, a compressive force is applied by lip 36 that is transmitted through both end wall 62 and wedge portion 70 of rigid retainer ring to induce both an axial and radial compression pre-load within bearing 24. A compressive pre-loading of bearing 24 is possible because of the nature of the bearing material in combination with the existence of slits 52. Slits 52 allow space for the bearing material to flow if the socket is closed above an ideal closure load. Thus, closure load can fluctuate above the ideal load without significant reduction in the functional integrity of the joint assembly. In contrast, the rigid nature of ball stud 26, retainer ring 28, and socket 22 prevents virtually all compression and the corresponding dimensional changes to these elements.

The use of only three components, namely bearing 24, ball stud 26, and retainer 28 within socket 22 reduces the negative effects of tolerance stack ups when compared to ball joint assemblies consisting of additional components. The limited number of components, the compression pre-loading of bearing 24, and the rigid nature of the remaining elements eliminates the need for a tolerance space inside joint assembly 20.

Under preferred conditions the pre-loading also provides an important self-adjusting feature. As wear takes place, compression pre-loading of bearing 24 is controllably released while maintaining zero axial or radial play of the assembled components. The angled arrangement between stepped portion 56 of bearing 24 and inner surface 66 of retainer ring 28 helps to provide maximum radial and axial bearing compression pre-load which is appropriate for high load applications utilizing higher torque levels.

Preferably, an annular channel 74 is defined by axial tip 72 of retainer ring 28, stepped portion 56 of bearing 24 and inner surface 32 of socket 22. The existence of channel 74 provides for dimensional variances due to manufacturing.

FIG. 2 also illustrates the existence of a plurality of annular grooves formed in spherical face 46. Grooves 76 are perpendicular to slits 52, but work in combination with the slits to provide lubrication between bearing 24 and stud head 38.

One of the major advantages of having a self-centering retainer ring 28 is the elimination of unwanted contact between the retainer ring and ball head 38. Metal to metal contact significantly reduces the wear and fatigue resistance of the joint assembly. Additionally, when a socket is closed having a retainer ring assembled in either a tilted or off-center orientation, stud pull out resistance is reduced and compression pre-loading of the bearing may be compromised. Not only is it self-centering, however, but retainer ring 28 simultaneously acts as a wedge to maximize both compressive axial and radial pre-load to bearing 24 as discussed above.

Figure 6:
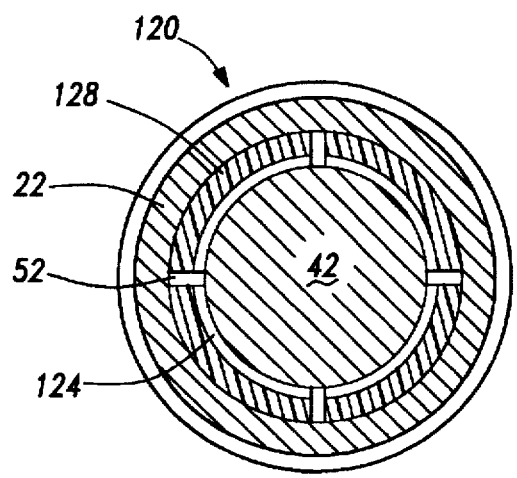
FIG. 6 is a cross-sectional top view of the second embodiment.

A second embodiment of the present invention, a ball and socket joint assembly 120 is illustrated in FIGS. 4 through 6. Assembly 120 includes a socket 122, a bearing 124, ball stud 26 and self-centering retainer ring 128. Unless otherwise discussed, assembly 120 has the same features as assembly 20. Assembly 120 is intended for lower load applications requiring improved torque control through low to moderate torque levels. One possible application involves a need for lower steering effort.

Lower torque requirements are provided by increasing the area of contact between bearing 124 and retainer ring 128. One way that the area of contact is increased involves an upper stepped portion 156 to bearing 124 having a radiused curvature rather then an angled cross-section. Inner surface 166 of retainer ring 128 is contoured to the radiused curvature of stepped portion 156. Area of contact is also increased by providing axial end 150 of bearing 124 with a radiused edge 151. A conforming radius is defined in a transition zone 163 of retainer ring 128 between end wall 162 and inner surface 166. Torque control may be further improved by providing end wall 162 of retainer ring 128 with a radiused radially outer edge 165 to distribute the force of socket compression through a greater surface area of the retainer ring.

Unlike the frusto-conical nose portion 48 and corresponding floor 54 of assembly 20, assembly 120 includes a nose portion 148 with a square corner 149 conforming to a mating floor 154 of socket 122. More radial and axial end play is possible because of a reduced area of contact and a corresponding wedging affect between the bearing and socket. However, such end play may be acceptable when lower torque is required.

Figure 7:
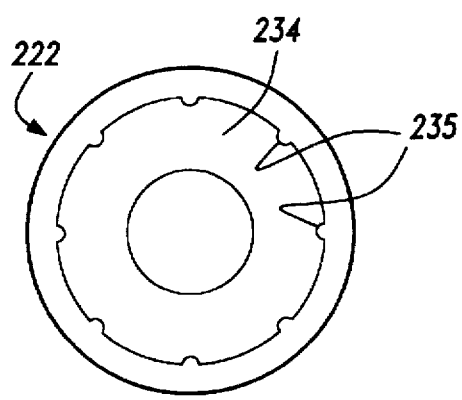
FIG. 7 is a top view of a socket according to a third embodiment of the invention.
Figure 8:
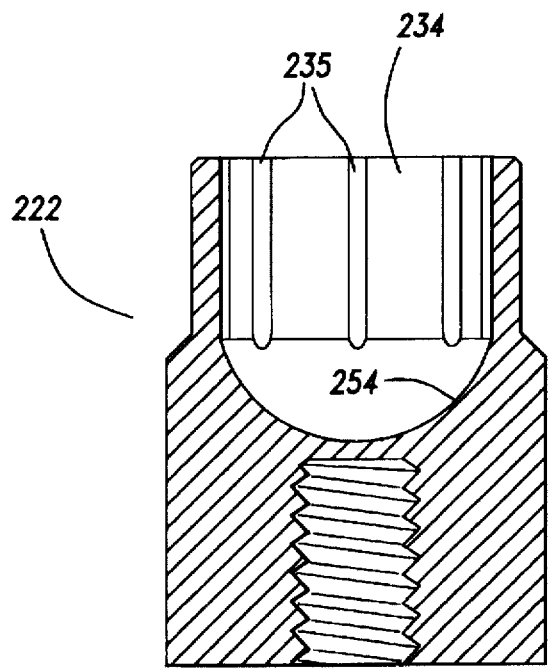
FIG. 8 is a side cross-sectional view of the third embodiment.

A third embodiment of a socket 222 is shown in FIGS. 7 and 8. Socket 222 has a cavity 234 with a generally spherical floor 254 adapted to conform to a corresponding nose portion of a bearing. Unlike sockets 22 and 122, which may be machined, cavity 234 is die formed. The bearing corresponding to cavity 234 is easier to mold. Such an arrangement is acceptable for applications with low load requirements. Cavity 234 also includes a plurality of axially extending ribs 235 parallel to axis A—A which are die formed in inner surface 232. Ribs 235 prevent the bearing from rotating in a cold temperature environment.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A ball and socket joint assembly comprising:
   a rigid metallic socket with an inner surface defining a cavity about an axis of symmetry;
   a semi-rigid annular bearing disposed with said socket cavity, said bearing including a spherical inner seat face, a nose portion with an outer surface conforming to said inner surface of said socket and a stepped upper portion spaced away form said inner surface of said socket and terminating at an axial end of said bearing, an annular pocket defined between said stepped upper portion and said inner surface of said socket;
   a ball stud with a spherical stud head and shank, said stud head engaging said spherical inner seat face of said bearing; and
   an annular rigid metallic retainer ring having a radially inner surface, a radially outer surface conforming to said inner surface of said socket, and an end wall defining an aperture at an upper end to receive said stud shank, said radially outer and inner surfaces of said ring defining a wedge portion received within said annular pocket to center said ring between said bearing and said housing;
   said end wall extending radially inward so as to overlap said axial end of said bearing.

2. An assembly as recited in claim 1, further comprising closure means to secure said bearing, said stud head and said retainer ring within said socket, a compressive force applied by said closure means that is transmitted through said end wall and wedge portion of said rigid retainer ring to place said semi-rigid bearing in compression pre-load within said rigid socket cavity.

3. An assembly as recited in claim 2, wherein said closure means includes a crimped annular lip of said socket.

4. An assembly as recited in claim 3, wherein said crimped annular lip of said socket and said end wall of said retainer ring are generally perpendicular to said axis of symmetry.

5. An assembly as recited in claim 4, wherein a radially outer edge of said retainer ring end wall is radiused to maximize an area of contact between said lip and said retainer ring.

6. An assembly as recited in claim 1, wherein said inner surface of said retainer ring is contoured like said stepped portion of said bearing.

7. An assembly as recited in claim 6, wherein said stepped portion of said bearing has an angled surface and said inner surface of said retainer ring wedge portion is contoured like said angled surface.

8. An assembly as recited in claim 6, wherein said stepped portion of said bearing and said inner surface of said retainer ring wedge portion share a common curvature.

9. An assembly as recited in claim 6, wherein a radially outer edge of said bearing axial end and a corresponding surface of said retainer ring wedge portion inner surface have a common radius.

10. An assembly as recited in claim 1, wherein said retainer ring wedge portion terminates at an axial tip and wherein an annular channel is defined by said axial tip, said stepped portion of said bearing and said inner surface of said socket cavity.

11. An assembly as recited in claim 1, wherein surface contact between said stud head and said inner seat face extends from said nose portion to said axial end of said bearing.

12. An assembly as recited in claim 1, wherein said radially outer surface of said retainer ring conforms to said inner surface of said socket along said full axial extent of said retainer ring.

* * * * *

UNITED STATES PATENT AND TRADEMARK OFFICE
CERTIFICATE OF CORRECTION

PATENT NO.   : 5,704,727
DATED        : Jan. 6, 1998
INVENTOR(S)  : Gregory R. Atkins, et al It is certified that error appears in the above-identified patent and that said Letters Patent is hereby corrected as shown below:

Column 6, line 28, replace "with" with --within--
Column 6, line 32, replace "form" with --from--
Column 6, line 38, replace "hearing" with --bearing--

Signed and Sealed this

Twenty-first Day of April, 1998

Attest:

BRUCE LEHMAN

Attesting Officer

Commissioner of Patents and Trademarks